July 1, 1930.  F. H. LOCK ET AL  1,769,378
COLLAPSIBLE BOX
Filed April 12, 1928   2 Sheets-Sheet 1
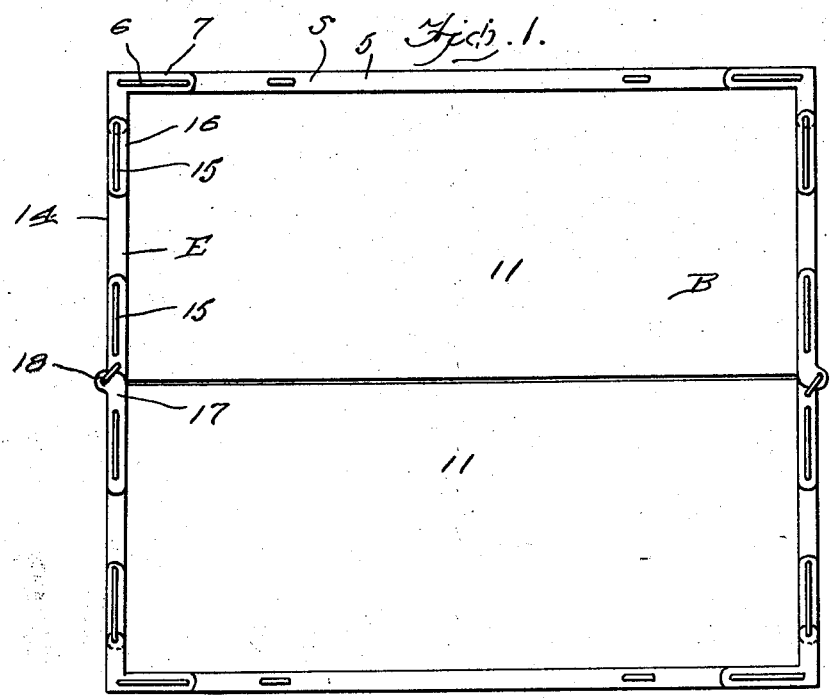
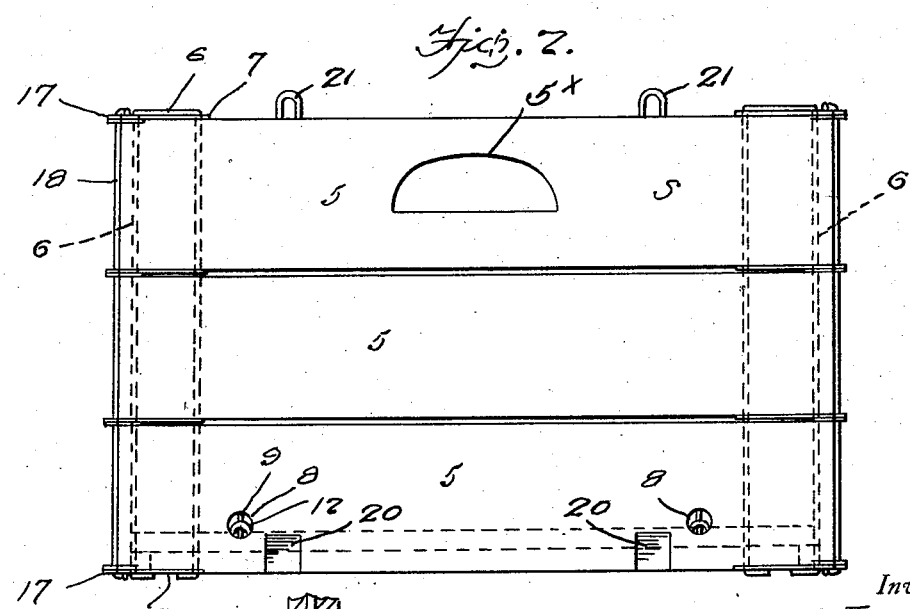
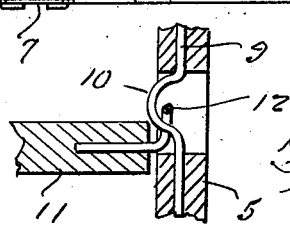
Inventors
F. H. Lock
W. H. Whitlow
By Clarence A. O'Brien
Attorney July 1, 1930.  F. H. LOCK ET AL  1,769,378
COLLAPSIBLE BOX
Filed April 12, 1928  2 Sheets-Sheet 2
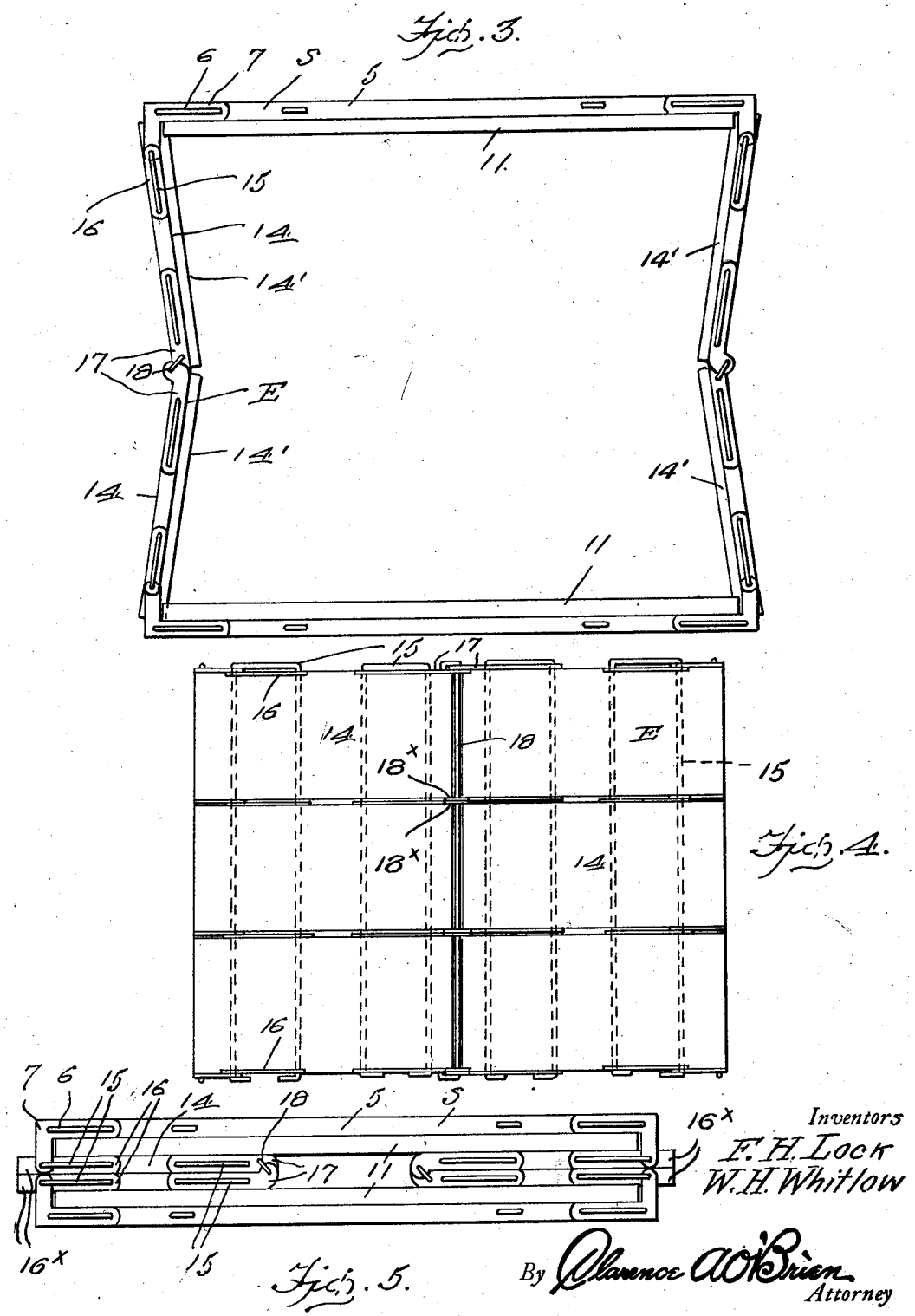

Patented July 1, 1930

1,769,378

UNITED STATES PATENT OFFICE

FRED H. LOCK AND WILEY H. WHITLOW, OF SOUTH RICHMOND, VIRGINIA, ASSIGNORS OF ONE-THIRD TO GEORGE E. ALLEN, OF VICTORIA, VIRGINIA

COLLAPSIBLE BOX

Application filed April 12, 1928. Serial No. 269,412.

The present invention relates to a collapsible box and has for its prime object to provide a box which has a bottom formed in two sections one hinged to each side thereof and a pair of ends formed in hingedly connected sections breakable inwardly of the box when the bottom sections are folded upwardly so that the box may be collapsed in a compact manner to take up little room when not in use and be capable of being conveniently carried in one hand.

A still further very important object of the invention resides in the provision of a box of this nature which is exceedingly simple in its construction, strong and durable, inexpensive to manufacture, and thoroughly efficient and reliable for the purpose intended.

With the above and numerous other objects in view as will appear as the description proceeds, the invention resides in certain novel details of construction, and in the combination and arrangement of parts as will be hereinafter more fully described and claimed.

In the drawing:

Figure 1 is a top plan view of the box embodying the features of our invention,

Figure 2 is a side elevation thereof,

Figure 3 is a top plan view of the box showing the bottom sections swung upwardly and the ends about to be collapsed inwardly, Figure 4 is an end elevation of the box, Figure 5 is a view showing the box collapsed, and Figure 6 is an enlarged detail section showing the hinge connection of one of the bottom sections with one of the sides.

Referring to the drawing in detail it will be seen that the letters S denote the two sides, the letters E the two ends and the letter B the bottom. Each side S comprises a plurality of elongated rectangular plates 5, Figure 2 disposed one above the other in the same plane and secured together by reinforcement rods 6 which are extended therethrough.

Angular hinge brackets 7 are held in place at the edges of the plates 5 adjacent the ends thereof. The bottom plates 5 of the sides S are provided with openings 8 and bars 9 extended across the openings and in the openings are bent inwardly as at 10. The bottom is formed in two sections 11 each of which has a pair of loops 12 through which the inwardly bent portions 10 of the bars 9 extend thereby hingedly mounting the bottom sections to the bottoms of the sides. The loops 12 are extended angularly and limit the swinging movement of the bottom sections 11 to the position shown in Figure 1 or to the position shown in Figure 5.

The ends are each formed in two hingedly connected sections. The sections of each end E comprises a plurality of rectangular plates 14 secured together by reinforcing bars 15 one of which passes through hinge brackets 16 and through the adjacent ends of hinge brackets 7. The sections of the ends are hingedly connected together by hinge brackets 17 secured in place by certain reinforcement bars 15 and through which extends pintle bars 18.

Said brackets 17 have their extremities directed outwardly of the box thereby allowing the end sections to break inwardly only. These end sections are held in the same plane with each other when the bottom sections 11 are down but when the bottom sections 11 are swung upwardly alongside the sides S the ends may be broken inwardly as is indicated to advantage in Figures 3 and 5, so that the box may be collapsed in the position shown in Figure 5.

By virtue of the bracket, 17 having their extremities directed outwardly of the box, and the pintle bars 18 being disposed in said outwardly directed extremities, it will be apparent that when the box is set up ready for use as in Figure 1, the pintle bars 18 will rest outwardly beyond and in alinement with the joint between the sections of the ends so as to reinforce and strengthen the contiguous ends of the sections and prevent the same moving outwardly beyond the positions in which the sections of the ends are in alinement.

The sides S are provided in their uppermost plates 5 with hand receiving openings 5$^x$, and manifestly when the box is collapsed as shown in Figure 5, the said hand openings 5$^x$ will be in registration and sufficiently close together for the reception of a single hand so as to enable a user to conveniently carry the collapsed box in one hand.

When the box is collapsed as shown in Figure 5, the ends of the end sections which are connected with the sides project beyond the sides as designated by 16× in Figure 5 so that said section ends will serve as fenders to protect the remainder of the collapsed box against injury when the extended ends contact with other objects.

As shown at 14' in Figure 3, the sections of the ends E are provided at their inner sides and near their lower edges with ledges on which the bottom sections 11 rest, when said bottom sections 11 are in working position.

As best shown in Figure 4 lapped plates 18× are secured by bars or rods 15 between the edgewise superposed plates 14 of the sections of the ends E, and the said lapped plates 18× receive the pintle bars 18.

For stacking purposes the lower plates 5 of the sides S are provided with recesses 20, and the upper plates 5 of said sides S are provided with upwardly extending projections 21, preferably in the form of staples, as shown. Manifestly when a plurality of boxes of our construction are superposed, the projections 21 of one box will rest in the recesses 20 of the next upper box so as to maintain the boxes in vertical alinement and against casual movement out of alinement with each other.

It is thought that the construction, operation, utility and advantages of the invention will now be clearly apparent to those skilled in this art without a more detailed description thereof. The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. In a collapsible box having sides and inwardly folding ends connected with the sides, handles complementary to the sides and relatively arranged to rest opposite each other in transverse alinement when the box is collapsed, whereby said handles may be grasped in a single hand of a user for the convenient carriage of the collapsed box.

2. In a collapsing box having sides and inwardly folding ends connected with the sides, handles complementary to the sides and relatively arranged to rest opposite each other in transverse alinement when the box is collapsed, whereby said handles may be grasped in a single hand of a user for the convenient carriage of the collapsed box; the said handles being afforded by registering openings in the upper portion of the sides, and the said openings being disposed at opposite sides of and in alinement with the space between the ends when said ends are in their inwardly folded positions.

In testimony whereof we affix our signatures.

FRED H. LOCK.
WILEY H. WHITLOW.